United States Patent
Ko et al.

(10) Patent No.: US 7,706,010 B2
(45) Date of Patent: Apr. 27, 2010

(54) METHOD FOR PRINTING A WEB PAGE

(75) Inventors: Junyong Ko, Gunpo-si (KR); Nakchul Sung, Anyang-si (KR)

(73) Assignee: Designmade Co., Ltd., Seoul (KR)

( * ) Notice: Subject to any disclaimer, the term of this patent is extended or adjusted under 35 U.S.C. 154(b) by 1115 days.

(21) Appl. No.: 11/347,705

(22) Filed: Feb. 6, 2006

(65) Prior Publication Data

US 2006/0290976 A1    Dec. 28, 2006

(30) Foreign Application Priority Data

Jun. 28, 2005    (KR) .................. 10-2005-0056431

(51) Int. Cl.
*G06F 3/12*    (2006.01)
*G06K 15/00*    (2006.01)
(52) U.S. Cl. .................... 358/1.15; 358/1.18
(58) Field of Classification Search ............... 358/1.15, 358/1.18, 1.1, 1.2, 1.9, 1.13, 1.6, 538, 537, 358/450, 1.5, 1.11, 1.12, 1.16, 540, 452, 358/453; 715/234, 239, 252, 274, 277, 273; 709/203, 219; 345/660, 619
See application file for complete search history.

(56) References Cited

U.S. PATENT DOCUMENTS 7,180,615 B2 *    2/2007    Price et al. .............. 358/1.15
2002/0196460 A1 *    12/2002    Parry .................... 358/1.15

* cited by examiner

*Primary Examiner*—Dov Popovici
(74) *Attorney, Agent, or Firm*—Rabin & Berdo, P.C.

(57) ABSTRACT

A method for printing a web page is provided. The method includes requesting for printing a web page of a web site connected to a web server after a user executes a web browser, downloading a web printing exclusive viewer on a personal computer of the user from the web server of the corresponding web site after requesting for printing the web page, and operating the web printing exclusive viewer, thereby generating from the web page an initial web page image to be sent to the printer and printed on the printing paper by the printer, wherein a size of the initial web page is adjusted such that an entire width of the initial web page image fits into a width of the printing area of the printing paper.

11 Claims, 5 Drawing Sheets

Yahoo!

| Auctions | Chat | Education | Members |
| Calendar | Classifieds | Greetings | Pets |

How to Suggest a Site | Company Info | Privacy Policy | Terms of Service | Jobs | Advertise With Us | Help

METHOD FOR PRINTING A WEB PAGE

BACKGROUND OF THE INVENTION

1. Field of the Invention

The present invention relates to a method for printing a web page, and more particularly, to a method for printing a web page by automatically adjusting the size of the web page to be fitted into a printing area of a web browser, or a portion of contents of the fitted web page.

2. Description of the Related Art

In a widely used web printing method, a specific web page is printed on a predetermined printing paper by default by selecting a printing menu provided from the web browser connected to the specific web page of a web server after a user executes the web browser.

However, when the size of the web page exceeds a printing area of the printing paper in the web browser, there is a problem that a specific area of the web page (e.g. a right end portion of the web page) is printed on the printing paper with a cut portion since the web page is printed on a printing paper in the portrait mode by default regardless of the size of the web page. Thus, the printing paper can be wasted and it is also quite frustrating for the user.

Actually, as illustrated in FIGS. 1 and 2, a home page of the printed Yahoo portal site (http://www.yahoo.com/) is printed on two A4 papers with a right portion cut using the printing menu provided from a Microsoft Internet Explorer (web browser).

On the other hand, the above problem of cutting a portion of the specific web page when printing can be resolved by switching from a portrait mode, which is set by default, to a landscape mode or changing the printing area of the printing paper in the portrait mode.

However, it is cumbersome to change the printing paper direction and the printing area (e.g. reducing a right margin) by selecting the printing menu each time printing the web page. Moreover, when the printing paper in the portrait mode is changed to the printing paper in the landscape mode, there is a still problem that a right end portion is cut when printing the web page with a width longer than that of the printing paper.

In the conventional method for printing the specific web page by selecting the printing menu, it is cumbersome for the user to copy corresponding contents from the web page, paste them on an additional word processor (e.g. MS word or Hangeul 2002), and print them when the user wants to print a necessary portion in the entire contents of the web page.

SUMMARY OF THE INVENTION

Accordingly, the present invention is directed to a method for printing a web page that substantially obviates one or more problems due to limitations and disadvantages of the related art.

An object of the present invention is to provide a method for printing a web page for printing the web page through a printer of the user after a printing button is selected in the printing menu when the web page image is displayed in the web printing exclusive control window and there is a request for printings a web page of a web site connected to a web server after a user executes a web browser by generating an initial web page image by automatically adjusting a size of a current web page to be fitted into a printing area of the web browser after the web printing exclusive viewer is automatically operated separately from a web printing viewer provided from the web browser for scroll-capturing the web page. Additionally, the method further includes printing contents corresponding to a selected area of the web page image when a specific area is selected in the web page image after selecting a select area button in the printing menu.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
FIGS. 1 and 2 are a Yahoo home page (http://www.yahoo.com/) using a printing menu provided from a Microsoft Internet Explorer.

According to an aspect of the present invention, there is provided a method for printing a web page, including: requesting for printing a web page of a web site connected to a web server after a user executes a web browser; downloading a web printing exclusive viewer on a PC of a user from a web server of a corresponding web site after requesting for printing the web page; generating an initial web page image by adjusting a size of a current web page to be fitted into a printing area of the web browser after the web printing exclusive viewer is automatically operated separately from a web printing viewer provided from the web browser for scroll-capturing the web page; determining whether the size of the initial web page image exceeds that of a printing page of the web browser by the web printing exclusive viewer; displaying the initial web page image on a web printing exclusive control window by the web printing exclusive viewer when the size of the initial web page does not exceed that of the printing page of the web browser; displaying a first web page image among a plurality of web page images on the web printing exclusive control window and the rest of web page images sequentially each time a page moving button is selected in a printing menu of the web printing exclusive control window after the initial web page is divided into the plurality of web pages by the web printing exclusive viewer in case the size of the initial web page exceeds that of the printing page of the web browser; and printing the web page, which is fitted into the printing area of the web browser by the web printing exclusive viewer, through a printer connected to the PC of the user after a printing button is selected in the printing menu when the web page image is displayed in the web printing exclusive control window.

The method further includes printing a web page, which contains contents corresponding to a selected area among entire contents of the web wage, through the printer when a specific area is selected from the web page image displayed in the web printing exclusive control window after selecting a select area button in the printing menu of the web printing exclusive control window.

The method further includes, when a first web page image is displayed among the plurality of web page images on the web printing exclusive control window after the initial web page is divided into the plurality of web page by the web printing exclusive viewer and the size of the initial web page exceeds that of the printing page of the web browser, printing one web page image, which is generated by combining the plurality of web page images, on one printing page through the printer when the printing button is selected after selecting a page setting button and a button for setting the web page image to a page height in the printing menu of the web printing exclusive control window.

The method further includes saving the web page as a specific image file in the PC of the user after selecting a save button in the printing menu when the web page image is displayed in the web printing exclusive control window.

Reference will now be made in detail to the preferred embodiments of the present invention, examples of which are illustrated in the accompanying drawings. Wherever possible, the same reference numbers will be used throughout the drawings to refer to the same or like parts.

Figure 3:
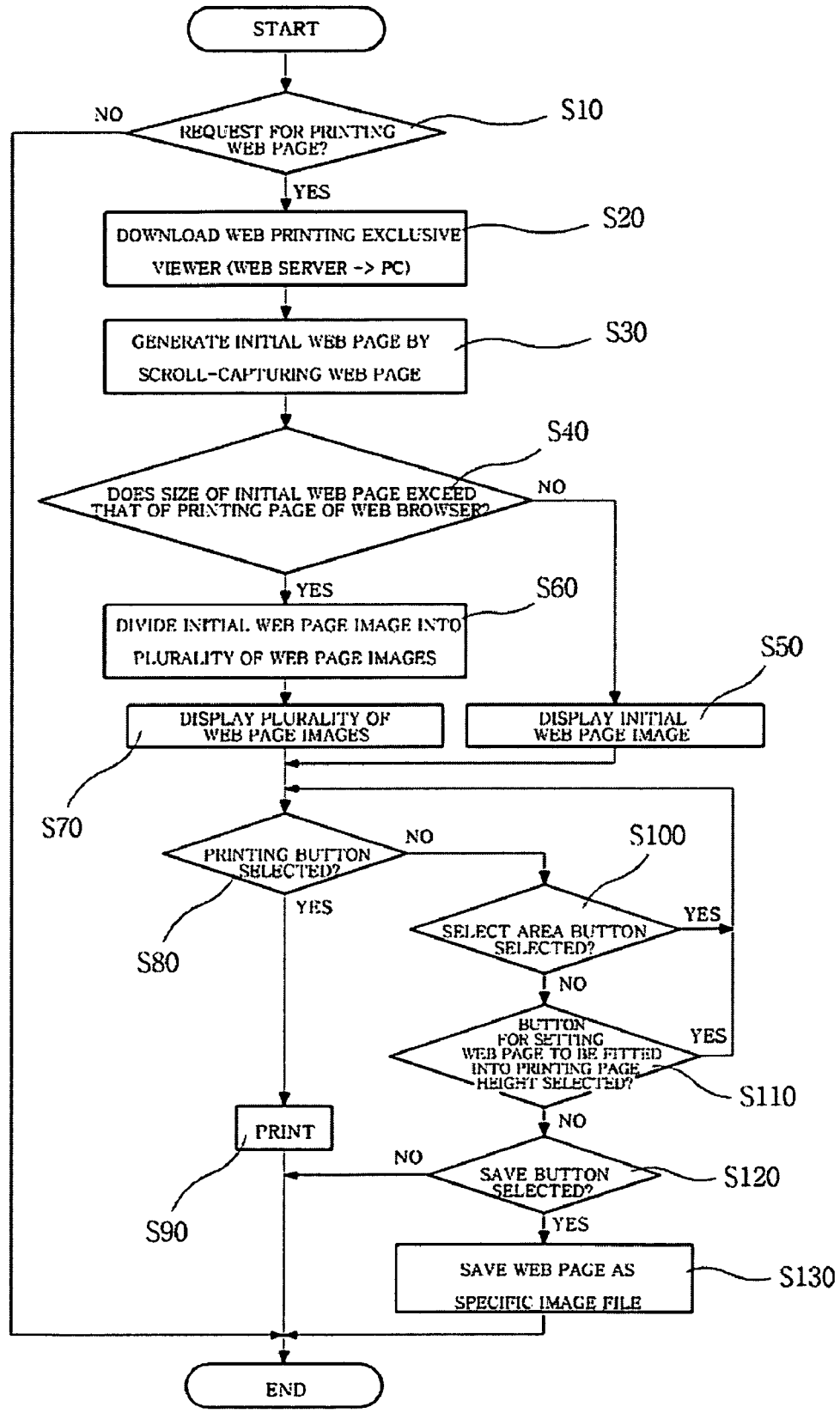
FIG. 3 is a flowchart illustrating a method for printing a web page according to an embodiment of the present invention.

FIG. 3 is a flowchart illustrating a method for painting a web page according to an embodiment of the present invention. Referring to FIG. 3, a PC is connected to a web page managed by a web server, and also a printer in a method for printing a web page. Additionally, it is assumed that a printing demand button is arranged to request for printing the web page of a web site.

First, a user executes a web browser installed on the PC, and then requests for printing a corresponding web page by selecting the printing demand button displayed in the web browser when connected to the web site in operation S10.

In operation S20, a web printing exclusive viewer is downloaded from the web server to perform printing the web page.

Accordingly, the web printing exclusive viewer in the PC of the user is operated separately from a web printing viewer provided from a conventional web browser. Moreover, the web printing exclusive viewer scroll-captures the web page from a beginning point to an ending point in a length and a width direction of the web page, respectively, and then the size of the captured web page is adjusted to be fitted into a printing area of a printing paper in the web browser. Consequently, an initial web page image is generated into a bitmap file format in operation S30.

Figure 2:
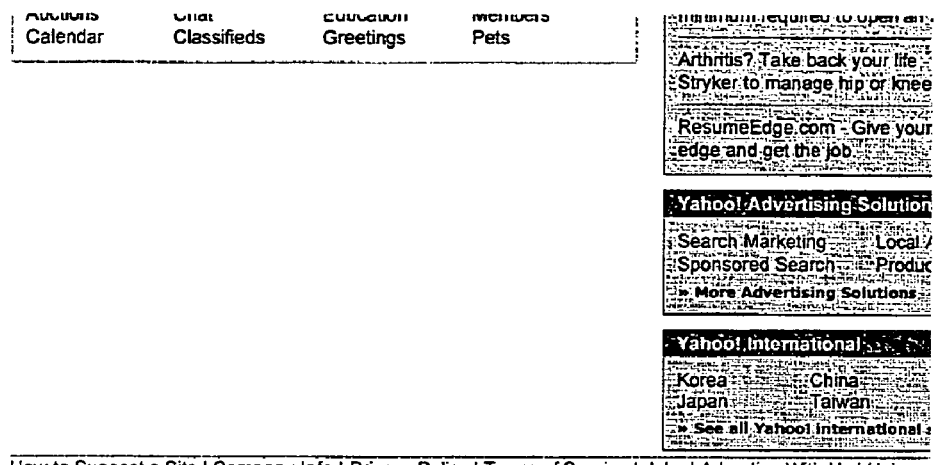

In operation S40, since the captured web page can be printed in one printing page or two printing pages as illustrated in FIGS. 1 and 2, it is determined that whether the size of the initial web page exceeds the printing page (e.g. A4 size) that is set by the web browser.

Figure 4:
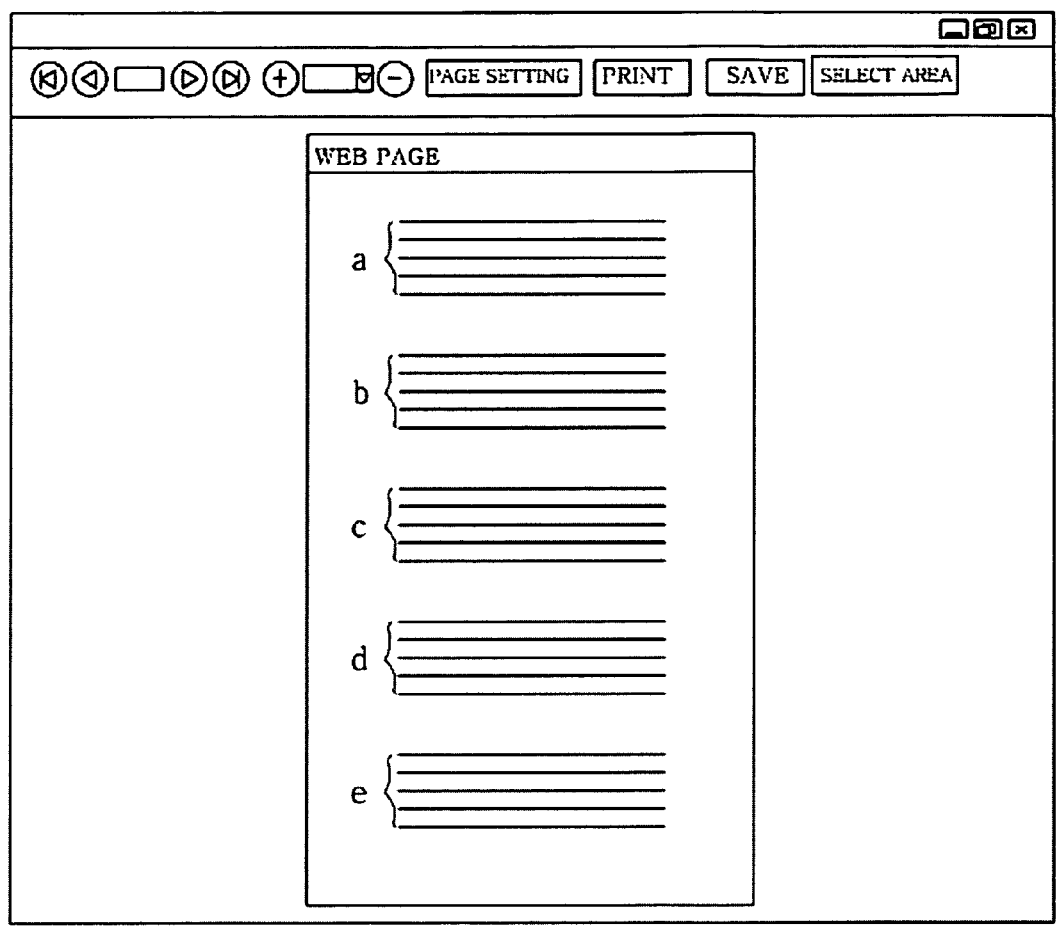
FIG. 4 is a web page image displayed on a web printing control window according to an embodiment of the present invention.

In operation S50, the web printing exclusive viewer displays the initial web page image on a web printing exclusive control window as illustrated in FIG. 4 when the size of the web page does not exceed the printing page. In this case, the current web page can be printed on one printing page.

Otherwise, when the size of the web page exceeds the printing page, the initial web page is divided into a plurality of web pages by the web printing exclusive viewer in operation S60. Then, a first web page image among the plurality of web pages is displayed on the web printing exclusive control window, and the rest of the web pages are displayed sequentially each time a page moving button is selected in a printing menu of the web printing exclusive control window in operation S70. In this case, the current web page is printed on the two printing pages as illustrated in FIGS. 1 and 2.

For reference, the web printing exclusive control window illustrated in FIG. 4 includes a printing menu part and a display window part. Additionally, the printing menu part includes page moving buttons (|◁, ◁, ▷, ▷|), page enlarge/reduce buttons (+,−), a page setting button, a printing button, a save button, and a select area button. The display window part displays the web page image.

The page moving buttons displays the web page image by selecting one from the plurality of web pages when the initial web page image is divided into the plurality of web page images. Additionally, the enlarge/reduce buttons displays the web page image in the current display window part after enlarging and reducing the web page image.

The page setting button can diversely set the web page image, which is displayed on the current display window part, to be fitted into a page width, a page height, a page, or an actual size. The printing button prints the web page image.

The save button saves the web page image as a specific image file in the PC, and the select area button prints a specific area of the web page selected by a user.

In operations S50 and S70, the web page image, which can be printed on one or two printing pages by default, is displayed on the web printing exclusive control window. When the user selects the printing button in operation S80, the web printing exclusive viewer prints the web page, which is adjusted to be fitted into the printing area of the printing page automatically, through the printer in operation S90.

At this point, the initial web page image corresponding to the current web page can be printed on one printing page without a right end portion cut as illustrated in FIG. 4. Moreover, the initial web page image divided into the plurality of web pages and corresponding to the current web page can be printed on two printing pages without a right end portion cut unlike in FIGS. 1 and 2.

Additional functions in a method for printing a web page will now be described in more detail.

First, when the web page image, which can be printed on one or two printing pages by default, is displayed on the web printing exclusive control window in operations S50 and S70, the user selects the select area button, and then a specific area in the web page image by controlling a mouse in operation S100 without selecting the printing button. Then, when the printing button is selected in operation S80, the web printing exclusive viewer prints the selected area of the web page through the printer in operation S90.

Figure 5:
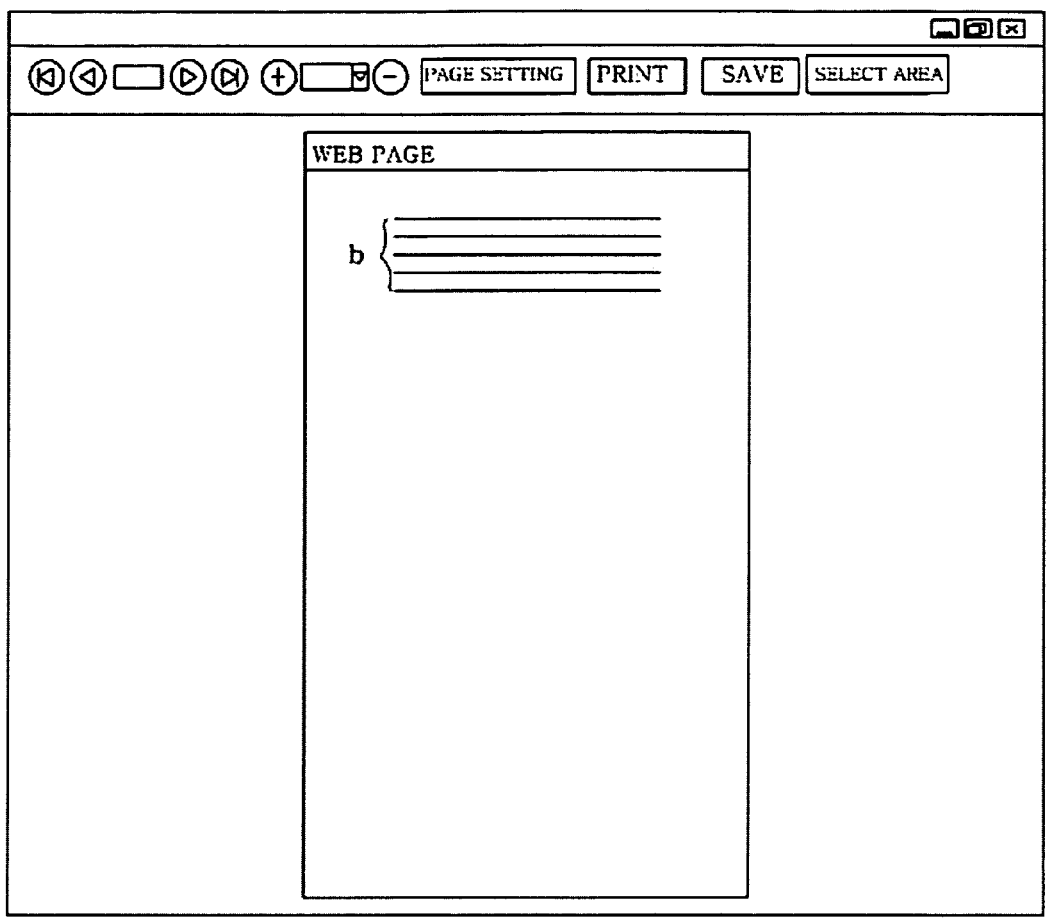
FIG. 5 is a portion of a web page image displayed on a web printing control window according to another embodiment of the present invention.

For example, when the specific web page containing sections a, b, c and d is displayed in the web printing exclusive control window as illustrated in FIG. 4, a specific section b is selected in the web page image by controlling the mouse after the select area button is selected in operation S100. When the printing button is selected in operation S80, the selected area b of the web page, which is adjusted automatically to be fitted into the printing area of the web browser, is printed as illustrated in FIG. 5 through the printer in operation S90.

Accordingly, the web user can print the only selected contents when printing a specific web page.

Second, when the size of the initial web page image exceeds the printing paper of the web browser in operation S70, the first web page image among the plurality of web pages is displayed on the web printing exclusive control window after the initial web page image is divided into plurality of web pages. Additionally, the page setting button is selected in the printing menu of the web printing exclusive control window, and then the button for setting the web page to be fitted into a height of the printing page among the page setting menus (e.g. setting the web page to be fitted into a page width, a page height, a page, and an actual size) is selected in operation S110. In operation S90, the web printing exclusive viewer prints the plurality of web pages on one printing page through the printer in the PC by combining all divided web page images into one web page image when the printing button is selected in operation S80.

Third, the web page image, which can be printed on one or two printing pages by default, is displayed on the web printing exclusive control window in operations S50 and S70. When the user selects the save button in operation S120, the web printing exclusive viewer saves the web page, which is adjusted automatically to be fitted into the printing area of the printing page as a specific image file (e.g. bmp, tif, jpeg, and pdf) in operation S130.

Accordingly, the web user can print the web page later without connecting the Internet by loading the specific image file.

As described above, the present invention can resolve the problem of a right end portion cut when printing the web page. Moreover, the user can print the only selected area in the entire web page without using an additional word processor.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method of printing a web page, comprising:
   requesting for printing a web page of a web site connected to a web server after a user executes a web browser;
   downloading a web printing exclusive viewer onto a personal computer of the user from the web server of the corresponding web site after requesting for printing the web page, the personal computer being connected to a printer that is loaded with a printing paper that has a printing area; and
   operating the web printing exclusive viewer, separately from a web printing viewer that is provided from the web browser, thereby generating from the web page an initial web page image to be sent to the printer and printed on the printing paper by the printer, wherein a size of the initial web page image is adjusted such that an entire width of the initial web page image fits into a width of the printing area of the printing paper.

2. The method of claim 1, further comprising displaying the initial web page image on a web printing exclusive control window after the generating of the initial web page image in the web printing exclusive viewer.

3. The method of claim 1, further comprising:
   after generating the initial web page image, determining whether a height of the initial web page image exceeds a height of the printing area of the printing paper;
   when the height of the initial web page image does not exceed the height of the printing area of the printing paper, displaying the initial web page image on a web printing exclusive control window by the web printing exclusive viewer; and
   printing the initial web page image through the printer after a printing button is selected in a printing menu while the initial web page image is displayed in the web printing exclusive control window.

4. The method of claim 2, further comprising:
   after generating the initial web page image, determining whether a height of the initial web page image exceeds a height of the printing area of the printing paper;
   when the height of the initial web page image does not exceed the height of the printing area of the printing paper, displaying the initial web page image on the web printing exclusive control window by the web printing exclusive viewer; and
   printing the initial web page image through the printer after a printing button is selected in a printing menu while the initial web page image is displayed in the web printing exclusive control window.

5. The method of claim 1, wherein the printer includes a plurality of printing papers, each printing paper having a printing area, and the method further comprises:
   after generating the initial web page image, determining whether a height of the initial web page image exceeds a height of the printing area of a first one of the printing papers;
   when the height of the initial web page image exceeds the height of the printing area of the printing paper, dividing the initial web page image into a plurality of sub-images including a first sub-image;
   displaying the first sub-image on a web printing exclusive control window, and also each of the remaining sub-images sequentially each time a page moving button is selected in a printing menu of the web printing exclusive control window; and
   printing the web page, which is fitted into the printing area of the printing paper by the web printing exclusive viewer, through the printer after a printing button is selected in the printing menu when the initial web page image is displayed in the web printing exclusive control window.

6. The method of claim 2, wherein the printer includes a plurality of printing papers, each printing paper having a printing area, and the method further comprises:
   after generating the initial web page image, determining whether a height of the initial web page image exceeds a height of the printing area of a first one of the printing papers;
   when the height of the initial web page image exceeds the height of the printing area of the printing paper, dividing the initial web page image into a plurality of sub-images including a first sub-image;
   displaying the first sub-image on the web printing exclusive control window and also each of the remaining sub-images sequentially each time a page moving button is selected in a printing menu of the web printing exclusive control window; and
   printing the web page, which is fitted into the printing area of the printing paper by the web printing exclusive viewer, through the printer after a printing button is selected in the printing menu when the initial web page image is displayed in the web printing exclusive control window.

7. The method of claim 1, wherein the generating of the initial web page image includes generating the initial web page image in a bitmap file format.

8. The method of claim 2, wherein the generating of the initial web page image includes generating the initial web page image in a bitmap file format.

9. The method of claim 2, further comprising:
   selecting a specific area of the initial web page image displayed in the web printing exclusive control window by selecting a select area button in a printing menu of the web printing exclusive control window, and then
   printing the selected specific area onto the printing paper.

10. The method of claim 2, further comprising,
    providing a button for setting a height of the initial web page image to a height of the printing area of the printing paper in a printing menu of the web printing exclusive control window;
    when the height setting button is selected, printing the initial web page image within the printing area of the printing paper.

11. The method of claim 2, further comprising:
    providing a save button in a printing menu when the initial web page image is displayed in the web printing exclusive control window; and
    when the save button is selected, saving the initial web page image as a specific image file in the personal computer.

* * * * *